C. NEUKIRCH.
BALL BEARING.
APPLICATION FILED FEB. 13, 1909.

1,146,272.

Patented July 13, 1915.
2 SHEETS—SHEET 1.

Witnesses
Harry King
Joseph C. Stack.

Inventor
Clemens Neukirch
By Julian C. Dowell
his Attorneys

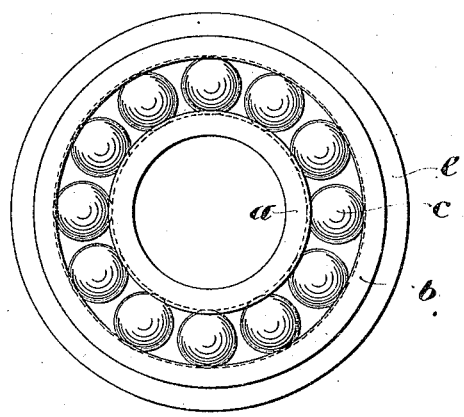
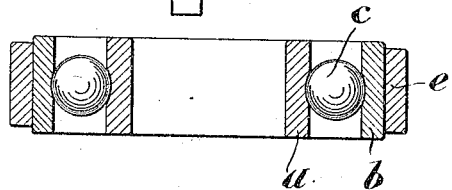

UNITED STATES PATENT OFFICE.

CLEMENS NEUKIRCH, OF WILMERSDORF, NEAR BERLIN, GERMANY, ASSIGNOR, BY MESNE ASSIGNMENTS, TO THE BEARINGS COMPANY OF AMERICA, OF JERSEY CITY, NEW JERSEY, A CORPORATION OF NEW JERSEY.

BALL-BEARING.

1,146,272.    Specification of Letters Patent.    Patented July 13, 1915.

Application filed February 13, 1909. Serial No. 477,693.

*To all whom it may concern:*

Be it known that I, CLEMENS NEUKIRCH, a subject of the King of Prussia, residing at Nos. 7–8 Nassauischestrasse, Wilmersdorf, near Berlin, Germany, have invented new Improvements in Ball-Bearings, of which the following is a specification.

My invention relates to unit-assembled annular ball-bearings having integral race-rings with no interruption of the continuity of the walls of the grooves thereof, and to a special method of assembling the bearings.

The object of the invention is to enable the balls to be inserted into the race-ways or grooves formed in the opposite cylindric faces of the concentric race-rings, without unduly stretching said rings which are made of hardened steel; and the invention involves a method which is characterized by first intentionally making the race rings of inaccurate dimensions, so as to allow the balls to be easily slipped through the enlarged interstice between the rings and into the grooves of the same, and then altering the diameter of one or both rings, in such a manner and degree that a tight fit of the rings and the balls located therebetween is obtained. This object is attained with a perfect result, when the outer ring is compressed in order to give it a smaller diameter, or when the inner ring is expanded until the balls are in close contact with both rings. This deformation may be produced and maintained with the aid of suitable means, and assistance may be given by using alternation of the temperature of the rings during assembling.

Figure 1:
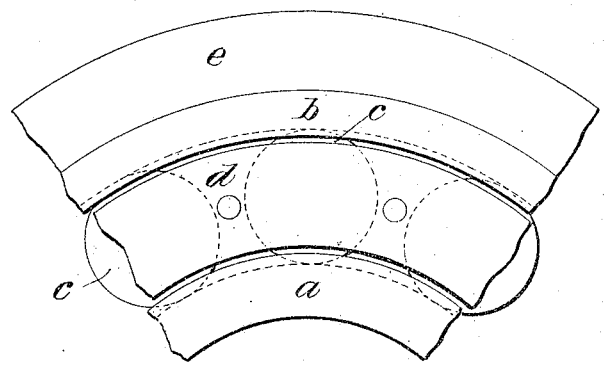
Figure 2:
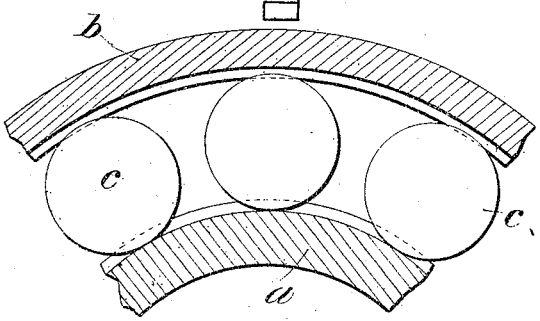
Figure 3:
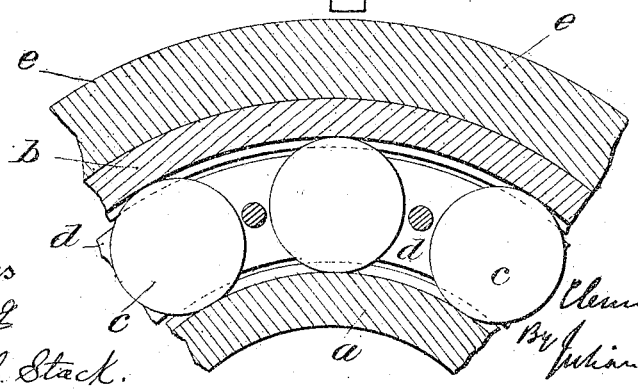

In the accompanying drawings, which form a part of this specification: Figure 1 is an enlarged side elevation of a segment of an annular ball-bearing made in accordance with my invention. Fig. 2 is a sectional view of a segment of the bearing before the outer race-ring is contracted. Fig. 3 is a similar view after contraction of the outer race-ring by shrinkage thereupon of a strengthening border ring. Fig. 4 is a side view of a complete ball-bearing embodying my invention. Fig. 5 is a cross section of the same.

In the drawings, $a$ and $b$ denote respectively the inner and outer race-rings, which are of hardened steel and are provided on their confronting cylindric faces with continuous, uninterrupted annular grooves or race-ways for a series of balls $c$, said grooves being preferably arc-shaped in cross-section. The balls may be arranged in a suitable retainer $d$.

In order to introduce the balls through the lateral interstice between the rings, which interstice is of less width than the distance between the grounds of the grooves, the outer ring $b$ is made of larger diameter than required for tightly holding the balls between the grooves, and the height of its lateral shoulders is such that the balls contained in the groove of the inner ring $a$ can be forced with a certain pressure into the groove of the outer ring. The balls may be placed in the retainer $d$ and arranged around the inner ring, whereupon these parts thus connected may be assembled with the outer ring by forcing the balls into it. The outer ring may however be enlarged by warming it in hot oil or the like so as to freely pass over the balls. In that condition the bearing will not be fit for use as the several parts being loosely connected with each other are not able to prevent shaking, although the balls are received in the grooves of both rings and surely held against escaping. Now a strong ring $e$ of any suitable material is heated to a convenient temperature, whereby it can be easily placed around the outer race ring, and then allowed to cool, when it will get a smaller diameter and at the same time definitely contract the race ring encircled by it to the predetermined proper size for producing the accurate shape and operation of the ball bearing, thereby condensing the structure of the steel ring.

Having thus described my invention, what I claim and desire to secure by Letters Patent is—

A ball bearing comprising two concentric integral race-rings having continuous uninterrupted ball-race grooves in their opposed circumferential faces, a circular series of balls between said rings, and a border ring compressing the outer of said race-rings and serving as a means for holding the several rings and balls together in permanent operative relation.

In testimony whereof I have signed my name to this specification in presence of two subscribing witnesses.

CLEMENS NEUKIRCH.

Witnesses:
HENRY HASPER,
WOLDEMAR HAUPT.

Copies of this patent may be obtained for five cents each, by addressing the "Commissioner of Patents, Washington, D. C."